Oct. 5, 1965

H. R. FOSNAUGH ETAL 3,209,615

STEERING WHEEL FABRICATION

Filed Oct. 24, 1963

INVENTORS
Harland R. Fosnaugh
BY Joe P. Pietrzak

Their Attorney

Oct. 5, 1965   H. R. FOSNAUGH ETAL   3,209,615
STEERING WHEEL FABRICATION
Filed Oct. 24, 1963   3 Sheets-Sheet 2
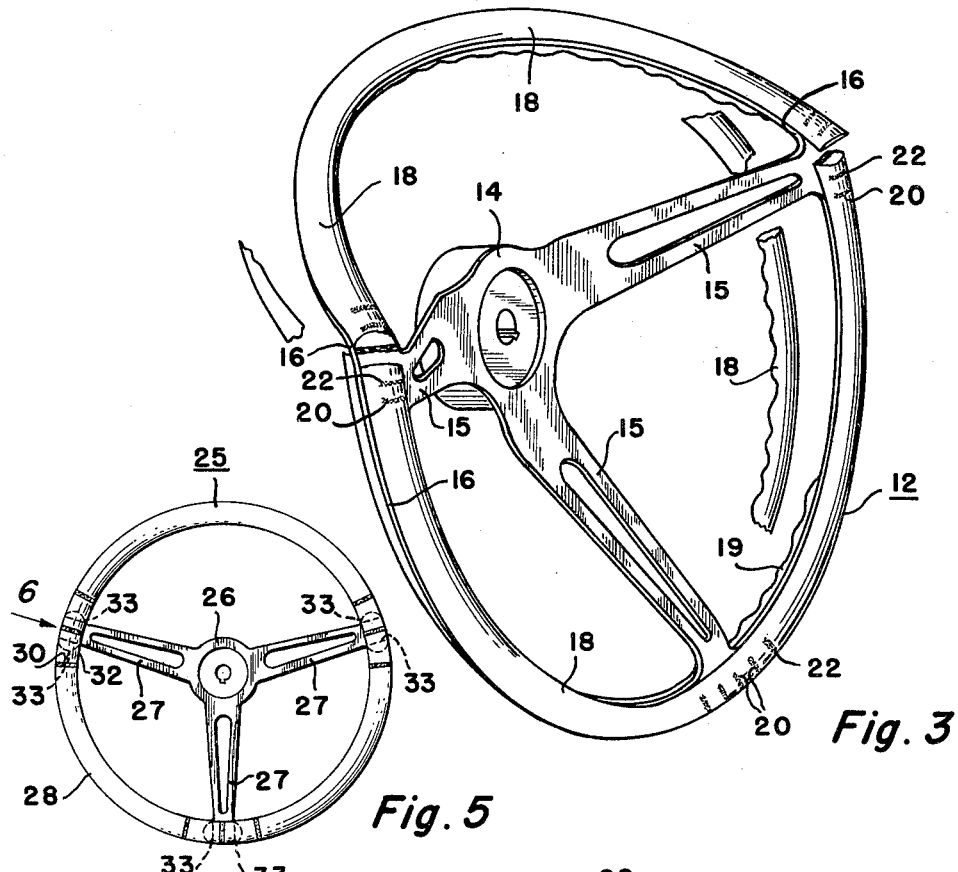
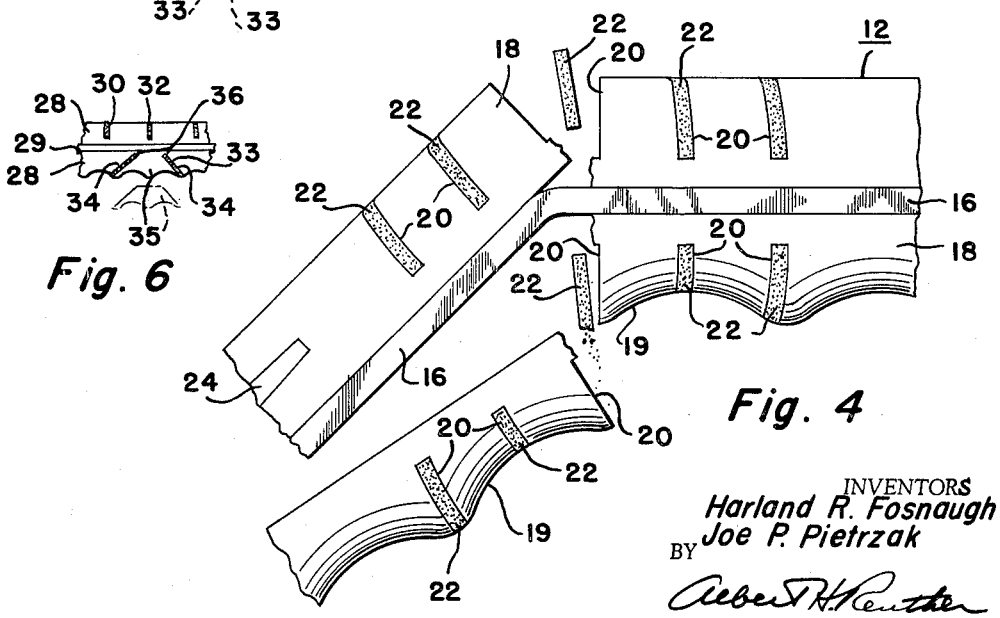
INVENTORS
Harland R. Fosnaugh
BY Joe P. Pietrzak
Their Attorney

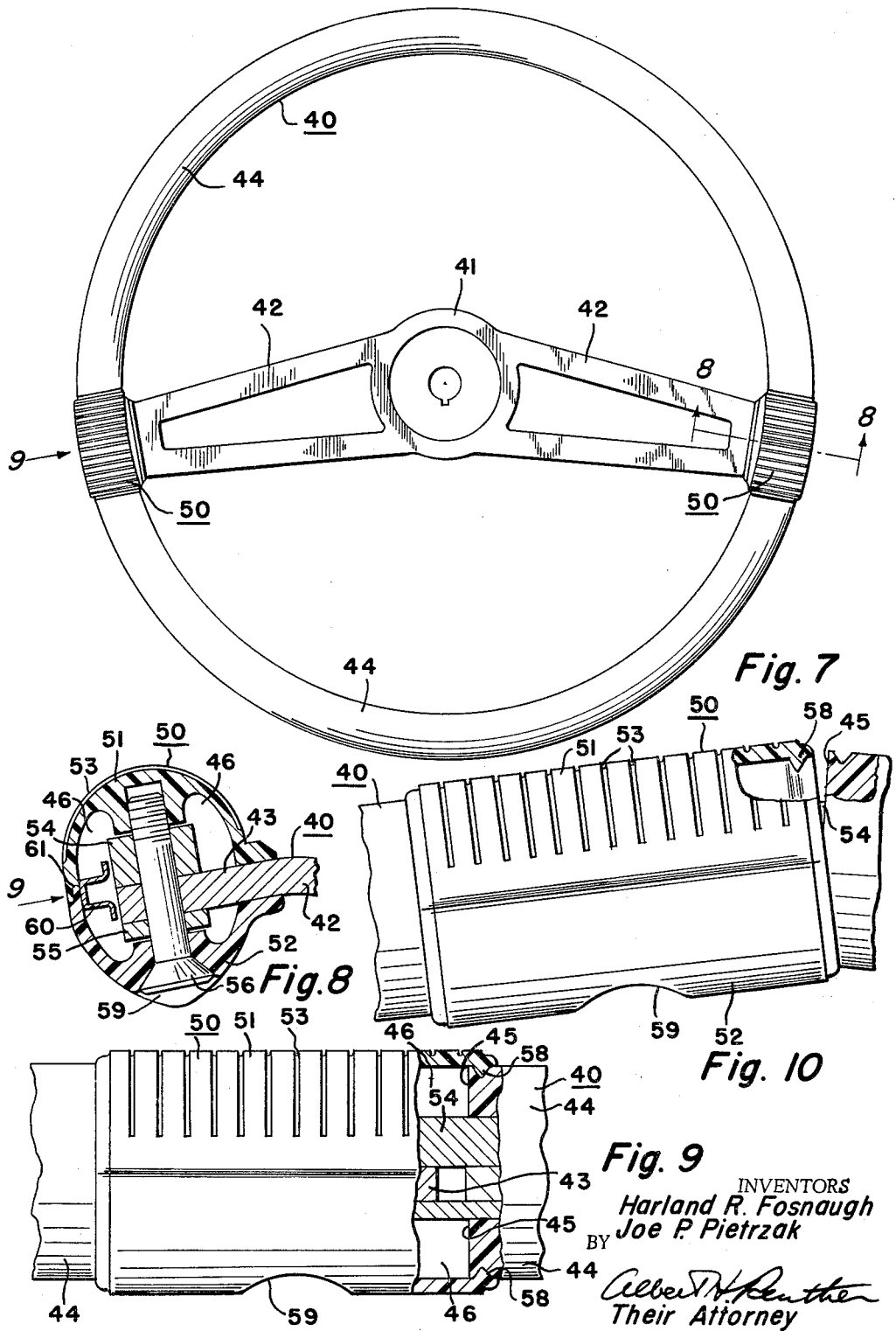

United States Patent Office 3,209,615
Patented Oct. 5, 1965

---

3,209,615
STEERING WHEEL FABRICATION
Harland R. Fosnaugh and Joe P. Pietrzak, Dayton, Ohio, assignors to General Motors Corporation, Detroit, Mich., a corporation of Delaware
Filed Oct. 24, 1963, Ser. No. 318,599
9 Claims. (Cl. 74—552)

This invention relates to fabrication of wooden rim steering wheels made splinter-resistant in accordance with the present invention.

Problems of safety particularly involving splintering have been encountered as a deterrent to use of wood for trimming steering wheel rims. Previously under impact there could be uncontrolled splintering which would result in possible injury to a vehicle operator. Accordingly, an object of the present invention is to produce a safe wooden rim steering wheel means that avoids readily caused damaging splinters under impact.

Another object of this invention is to provide safety steering wheel means having a bendable-metal rim insert carrying wood therewith slotted substantially transversely in localized areas where breakage is to be facilitated for minimizing splintering along grain of the wood.

Another object of this invention is to provide safety steering wheel structure having substantially radial spoke means and a bendable-metal rim insert joined therewith carrying wood trimming along opposite sides of the rim insert, there being plural slotting substantially transversely in the wood trimming subject to filling with compressible material such as elastomer, resin and the like to control breaking with a minimum of possible splintering.

A further object of this invention is to provide safety steering wheel structure having substantially radial spoke means and a bendable-metal rim insert joined therewith carrying wood trimming along opposite sides of the rim insert and having substantially radially of spoke means as well as having a predetermined depth for a predetermined peripheral distance subject to non-bonding filler added therein at high stress area where orientation of slot angle can be less than 45° to grain of the wood in order that under compression any remaining wedge will break out without causing damaging splinters.

Another object of this invention is to provide a safety steering wheel assembly having substantially radial spoke means and a bendable-metal rim insert joined therewith carrying opposite wooden segments having a gap peripherally therebetween in a location in substantial alignment with spoke means as well as a ribbed die cast ferrule trimming complementary to the gap to allow the wooden segments to pull away from beneath the ferrule trimming and possible trimming break under bending impact both in compression as well as tension.

Further objects and advantages will become apparent from the following description, reference being had to the drawings wherein preferred embodiments of the present invention are clearly shown.

In the drawings:

FIGURE 3 is a perspective view to show breaking of a steering wheel of a type shown in FIGURE 1.

FIGURE 4 is an enlarged fragmentary view to illustrate wheel breaking of FIGURE 3.

FIGURE 5 is a plan view of another steering wheel means with wood trimming having features further in accordance with the present invention.

FIGURE 6 is a fragmentary side view taken in the direction of arrow 6 in FIGURE 5.

FIGURE 7 provides a plan view of steering wheel assembly with a gap between wood segments covered by die cast ferrule trimming further in accordance with the present invention.

FIGURE 8 is a fragmentary cross-sectional view taken along line 8—8 in FIGURE 7.

FIGURE 9 is a fragmentary partially-sectioned view taken in the direction of arrow 9 in FIGURE 8.

FIGURE 10 is a fragmentary view to show breaking in a location similar to that of FIGURE 9.

Figure 1:
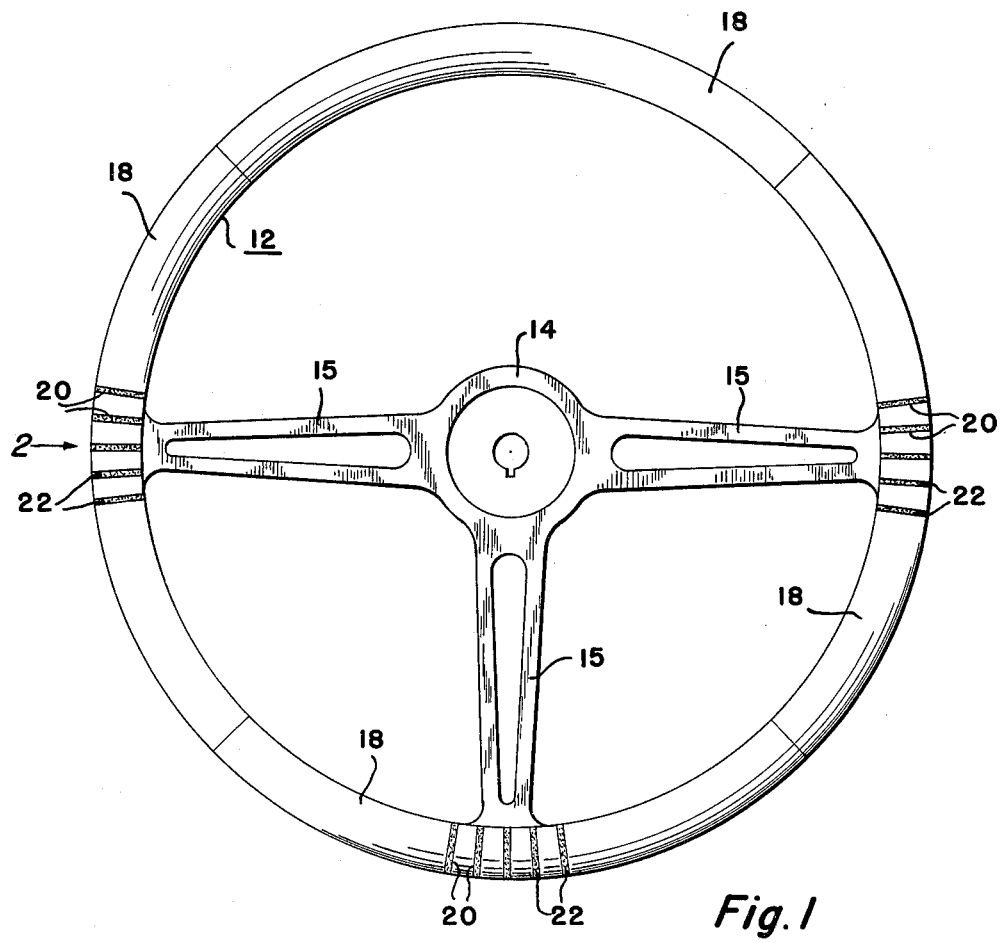
FIGURE 1 is a plan view of safety steering wheel means with wood trimming having features in accordance with the present invention.

In FIGURE 1 there is shown a steering wheel means generally indicated by numeral 12 having a central hub portion 14 and substantially radially extending spoke means 15 in a well known manner. Such spoke means can be suitably joined at outer ends thereof to a bendable-metal rim insert means 16 having suitably bonded or secured thereto arcuate wood trimming segments 18 collectively forming a wheel rim. Wooden segments 18 along an underside of the rim portion can have a plurality of recesses 19 contoured to accommodate fingers of a vehicle operator. Such recesses 19 can enhance maintenance of a grip and handling of the steering wheel means 12 by a vehicle operator.

Figure 2:
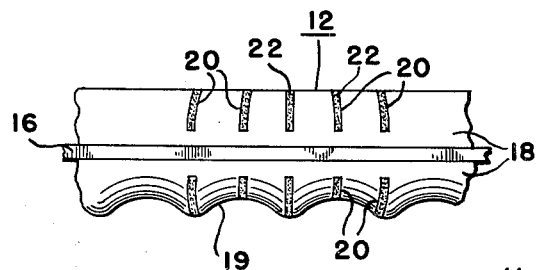
FIGURE 2 is a fragmentary side view taken in the direction of arrow 2 in FIGURE 1.

In accordance with the present invention the steering wheel means 12 is further provided with a plurality of transverse slots or cutouts 20 which extend a predetermined distance into the wooden segments 18. These cutouts 20 are localized in areas substantially radially in alignment with spoke means 15 as can be seen in FIGURE 1. The depth or predetermined distance of cutouts into the wooden segments in the embodiment of FIGURES 1 and 2 is less than total depth or height of the wooden segments. For example, the localized area in which the cutouts 20 are provided can extend for an arcuate or peripheral distance of substantially two inches and can have a width of substantially .300 inch in the top and bottom of the rim segments, cut to a depth of within substantially one-eighth of an inch on either side of the bendable-metal rim insert 16. Further in accordance with the present invention, each of the cutouts 20 can be provided with a filler means 22 of suitable compressible material such as elastomer, resin and the like. The cutouts or grooves 20 having the filling 22 therein can be provided with simulated or plastic wood with walnut, mahogany and other wood finishes. Such filling material 22 can blend with the wooden segments of the rim portion to be hardly noticeable therewith or could be made in a contrasting color to enhance the decorative appearance of the steering wheel means though actually the filling 22 and cutouts or grooves 20 serve a very useful purpose so far as the safety of a vehicle operator is concerned.

FIGURE 3 illustrates a steering wheel means similar to that of FIGURE 1 except that due to impact there has been a bending of the insert means 16 accompanied by a breaking of wood segmenting within localized areas substantially in alignment transversely with the cutouts or grooves 20 as can be better seen in the view of FIGURE 4. The filling 22 under such impact can be compressed possibly to crumbling as indicated in FIGURE 4 along a lower peripheral wooden segmenting while along an upper periphery such a filling 22 can fall aside subject to severance or wood breaking in alignment with the slot or cutout 20 in a location adjacent to where bending of insert 16 occurs.

In FIGURE 5 there is shown another steering wheel means generally indicated by numeral 25 having a central hub portion 26 and spoke means 27 extending radially outward therefrom. Wooden segments 28 can be joined or suitably bonded to extend arcuately and peripherally on opposite sides of a bendable-metal insert means 29 shown also in FIGURE 6. Grooves or cutouts 30 having filling 32 therewith can be provided along upper peripheral wooden segments in a manner similar to that illustrated and identified by reference numerals 20 and 22, respectively in the previous embodiment. However, along an underside or along the lower periphery wooden segments there can be slanted or angularly located cutouts or grooves 33 provided with filling 34 on opposite sides of a wooden wedge portion 35 which can be broken away or displaced as indicated in FIGURE 6. This wedge portion can include the indentations for finger contouring and upon impact under compression the slanting location of the cutouts 33 will result in a break substantially in alignment with wood grain between ends 36 of the cutouts, slots or grooves 33. Such a break between the ends 36 of the slanted grooves or cutouts 33 will result in dispersal of the filling 34 subject to compression and/or shearing such that the wedge portion 35 is separated therefrom to permit free bending and controlled splintering in a localized area. An upper rim periphery can be provided with the cutouts or grooves 30 having filling 32 therewith for a break similar to that illustrated for the previous embodiment. An angle of 45° or less exists as an arcuate distance between center line of the cutouts or slanted grooves 33 with respect to the bendable metal insert 29 prior to any impact or bending force applied thereto. More specifically, an angle of 40° with a distance in a range between one and two inches between outer ends of the slanted grooves 33 can be successful for controlled wood breaking. Also the slanted grooves or cutouts 33 extend into the lower wood segments for a distance slightly less than full transverse depth or height of such wood segmenting. It is to be understood that dove-tail joints with bonding in a plurality of locations equally spaced can serve to secure the wooden segments peripherally to each other subject to filling of the cutouts or grooves as noted earlier. The grooves or cutouts as pre-cut in the wood segments can avoid serious and uncontrolled splintering of wood to permit localized bending and/or steering wheel breaking substantially radially in alignment with spoke means under predetermined force of impact of a body of an operator or vehicle occupant.

Another solution to control breaking in localized areas can be seen in illustrations of FIGURES 7, 8, 9 and 10 of the drawings representing another steering wheel assembly generaly indicated by numeral 40. This steering wheel means 40 also includes a central hub portion 41 as well as radially outwardly extending spoke means 42 suitably joined to a bendable-metal insert means 43. The insert means 43 can be seen in views of FIGURES 8 and 9 of the drawings. A bending of the insert means 43 is represented in FIGURE 10 of the drawings. Suitable and partially curved wooden segmenting 44 can be bonded or attached to opposite sides of the insert means with ending 45 of such segmenting 44 leaving a gap or opening 46 as represented in views of FIGURES 8 and 9. The segmenting 44 provides a wood trimming subject to interruptions or gaps in location substantially radially in alignment with the spoke means 42 and subject to concealing of such gaps or interruptions by metallic die-cast ferrule trim means generally indicated by numeral 50. Such trim means can have first and second complementary sections 51 and 52 that are fitted on opposite sides of the metal insert 43. Upper recessing, grooves or undercuts 53 can be provided in the die-cast portion 51 as indicated in FIGURE 10. A spacer means 54 can be located between the upper die-cast portion 51 and the insert means 43. Another spacer segment or portion 55 can be located between the insert means 43 and the lower die-cast section or portion 52. A suitable fastening means or flat headed screw 56 shown in FIGURE 8 can be fitted to hold the upper and lower sections or portions 51–52 as well as the spacers 54–55 in assembled relation to the insert means 43 so as to conceal the gap or interruption 46 between the wood segmenting 44 having endings 45 as noted earlier. Further it is to be noted that a radially inwardly extending projection 58 can be initially in anchoring relationship immediately adjacent to the endings 45 of the wood segmenting 44 subject to breaking away of the endings from the projections 58 as represented in FIGURE 10. An arcuate cutout 59 can accommodate the head of the fastening means or screw 56 in fitting the lower die-cast portion 52 as represented in FIGURE 10. A further spacing clip 60 shown in FIGURE 8 can have a substantially U-shaped configuration and there can be an overlap or dove-tail interfit 61 of the upper and lower die-cast portions 51–52.

It is to be understood that the features of the present invention are particularly adapted to protect a vehicle passenger or operator against wood splintering in an uncontrolled manner. The combination of such controlled breaking areas on a wooden steering wheel means can permit enhancing of vehicle interiors as well as improved safety of such interiors in spite of provision of previously dangerous wood which could splinter.

Safety steering wheel means in accordance with the present invention will not readily cause damaging splinters under impact. Provision of slots as well as a larger interruption or gap can assure separation at high stress areas. The gap allows pulling away of the trimming segments from beneath the ferrule under impact, both in compression as well as tension. The slots parallel to each other as well as slots oriented toward each other at an angle of less than 45° to the grain of the wood can have compressible filling such as rubber, resin and the like aiding to avoid damaging splinters.

While the embodiments of the present invention as herein disclosed constitute preferred forms, it is to be understood that other forms might be adopted.

What is claimed is as follows:

1. Safety steering wheel means, comprising a hub portion, spoke means extending radially outwardly from said hub portion, a bendable-metal outer insert joined to said spoke means, and wooden partially curved segmenting carried on said bendable-metal insert and having localized grooving for control of break splintering under impact.

2. The steering wheel means of claim 1 wherein said grooving is substantially in radial alignment with said spoke means.

3. The steering wheel means of claim 1 wherein said grooving includes plural cuts parallel to each other and substantially in radial alignment with said spoke means.

4. The steering wheel means of claim 1 wherein said segmenting along an underside of said insert has plural locations of grooving in which a pair of cuts slanted toward each other define a wedge separable under impact.

5. The steering wheel means of claim 1 wherein said segmenting along an underside of said insert has plural locations of grooving in which a pair of cuts at an angle up to 45° with wood grain extend toward each other a short distance from said insert and form a wedge separable under impact.

6. The steering wheel means of claim 1 wherein said grooving is provided with compressible filler material such as elastomer, resin and the like.

7. On a safety steering wheel assembly having substantially radial spoke means and a bendable-metal rim insert joined therewith, comprising, in combination, opposite arcuate segmenting carried on said insert though separated by a gap therebetween in localized areas, and a die-cast ferrule trimming complementary to the gap to allow separation and pulling apart of said segmenting from said trimming under impact and insert bending at gap locations.

8. The combination assembly of claim 7 wherein said ferrule trimming includes dove-tail mating sections secured to said insert in gap locations aligned with the radial spoke means.

9. The combination assembly of claim 7 wherein said ferrule trimming includes grooving along outer surfacing thereof.

References Cited by the Examiner

UNITED STATES PATENTS

| | | | |
|---|---|---|---|
| 1,476,347 | 12/23 | Martin | 74—552 |
| 1,943,915 | 1/34 | Geyer | 74—552 |
| 2,311,317 | 2/43 | Tegarty | 74—552 |
| 2,895,345 | 7/59 | McClure | 74—493 |

FOREIGN PATENTS 761,424  1/34  France.

BROUGHTON G. DURHAM, *Primary Examiner.*